(12) United States Patent
Inglese et al.

(10) Patent No.: US 8,400,635 B2
(45) Date of Patent: Mar. 19, 2013

(54) EQUIPMENT AND METHOD FOR MEASURING DENTAL SHADE

(75) Inventors: Jean-Marc Inglese, Bussy Saint Georges (FR); Anne C. Croguenec, Rives (FR); Julien D. Barneoud, Bussy Saint Martin (FR)

(73) Assignee: Carestream Health, Inc., Rochester, NY (US)

( * ) Notice: Subject to any disclaimer, the term of this patent is extended or adjusted under 35 U.S.C. 154(b) by 1251 days.

(21) Appl. No.: 10/598,017

(22) PCT Filed: Feb. 7, 2005
(Under 37 CFR 1.47)

(86) PCT No.: PCT/EP2005/001208
§ 371 (c)(1),
(2), (4) Date: Jan. 8, 2010

(87) PCT Pub. No.: WO2005/080929
PCT Pub. Date: Sep. 1, 2005

(65) Prior Publication Data
US 2010/0201986 A1 Aug. 12, 2010

(30) Foreign Application Priority Data
Feb. 20, 2004 (EP) .................................... 04356023

(51) Int. Cl.
*G01J 3/46* (2006.01)
(52) U.S. Cl. ...................................................... 356/402
(58) Field of Classification Search .............. 356/72–73, 356/405–406
See application file for complete search history.

(56) References Cited

U.S. PATENT DOCUMENTS

| | | | |
|---|---|---|---|
| 4,654,794 A | 3/1987 | O'Brien | |
| 5,690,486 A | 11/1997 | Zigelbaum | |
| 5,759,030 A | 6/1998 | Jung et al. | |
| 5,798,839 A | 8/1998 | Berner et al. | |
| 5,883,708 A * | 3/1999 | Jung et al. | 356/73 |
| 6,157,454 A | 12/2000 | Wagner et al. | |
| 6,361,489 B1 | 3/2002 | Tsai | |
| 6,525,819 B1 * | 2/2003 | Delawter et al. | 356/406 |
| 2002/0159066 A1 | 10/2002 | Berstis | |
| 2003/0190578 A1 | 10/2003 | Lehmann | |

FOREIGN PATENT DOCUMENTS

| | | |
|---|---|---|
| DE | 19646923 | 5/1998 |
| WO | 00/12026 | 3/2000 |

OTHER PUBLICATIONS

International Search Report, International Application No. PCT/EP2005/001208, 5 Pages, Jun. 10, 2005.
European Search Report, European Publication No. 1 566 617 Al, 4 Pages, Aug. 17, 2004.

* cited by examiner

*Primary Examiner* — Kara E Geisel

(57) ABSTRACT

The invention relates to a device for measuring dental shade comprising: —illumination means (24, 40, 42, 44, 48, 50), for successively illuminating at least one part of a tooth (D) with light of various spectral ranges, —at least one sensor (26) sensitive to light coming from said tooth part, in response to the illumination, to generate for each different color of illumination, at least one measurement signal, —means (30, 32) for converting the measurement signals corresponding to said tooth part, into the coordinates of a measurement point (202), in a shade space in which "reference" points (320, 410, 540) are also defined, corresponding to the preset shades of a dental shade guide, and—search means (114), for the tooth part, for a shade corresponding to the reference point closest to the measurement point, in the shade space.

17 Claims, 3 Drawing Sheets

EQUIPMENT AND METHOD FOR MEASURING DENTAL SHADE

FIELD OF THE INVENTION

The present invention relates to a device and a method for measuring dental shade. Dental shade means a set of tooth characteristics that aim to establish the appearance of the tooth as faithfully as possible. The dental shade is thus the tooth color, but can also include other parameters such as the tooth tone, its transparency or surface condition, etc. Indeed these parameters have an influence on the actual appearance of the tooth.

The invention has applications in the field of dental care, and in particular in the production of dental prostheses.

BACKGROUND OF THE INVENTION

The evaluation of the shade of a tooth can be performed visually by a dentist. It is performed, for example, by comparing a tooth to be replaced with a number of reference teeth of a dental shade guide. There are several types of dental shade guides. Generally, dental shade guides have various color ranges, and for each color range, a set of reference teeth with various color saturations.

Visual evaluation allows the dental specialist to take into account the special features of each tooth, and especially any inhomogeneities. However, and despite standardized lighting, the visual evaluation method, remains a subjective method. In particular errors can result from faulty color perception or the practitioner's visual fatigue.

A more objective evaluation can be performed using a colorimeter. The colorimeter analyzes the spectral response of a tooth in a wide band of excitation light. It can be linked to suitable visualization software, to prepare a shade map of a tooth. The shade map is then displayed on a control screen. A colorimeter of this type is commercially available, for example the Shade Scan make.

SUMMARY OF THE INVENTION

The use of a colorimeter enables, as previously shown, the evaluation of dental shade to be freed from the subjectivity part related to the practitioner. Nevertheless, a number of difficulties can persist.

A first difficulty relates to the lighting of the tooth. The ambient light or interference reflections of the analysis light are all possible causes of uncontrolled lighting, and thus of shade measurement error.

Another difficulty is in particular linked to any brilliancies, or inhomogeneities of the tooth that risk altering the evaluation of its shade. It may also be noted that the light diffused by the back of the mouth proper is capable of constituting a back lighting for certain teeth and modifying their shade measurement.

Yet another difficulty consists in converting the shade measurements supplied by the colorimeter into data capable of being interpreted unambiguously by a dental technician. Indeed, the dental technician does not necessarily have equipment calibrated and adjusted to the colorimeter, and does not know the lighting conditions and defects of the tooth.

Finally, a difficulty relates to the bulkiness of certain colorimeters that limits their use only to teeth in the front part of the mouth.

In order to obviate the difficulties mentioned above, the invention relates more precisely to a dental shade measuring device comprising:

illumination means, for successively illuminating at least one part of a tooth with light of various spectral ranges, at least one monochrome sensor sensitive to intensity of light coming from said tooth part, in response to the illumination, to generate for each different color of illumination, at least one measurement signal, means for converting the measurement signals corresponding to said tooth part, into the coordinates of a measurement point, the measurement point being defined, in a shade space in which reference points are also defined, corresponding to the preset shades of a dental shade guide, and automatic search means, for the tooth part, for automatically searching a shade corresponding to the reference point closest to the measurement point, in the shade space.

The shade space is a space with several dimensions, comparable to a color space. It can therefore be subtended by several color vectors, corresponding to various space dimensions, but also by vectors representative of other parameters such as the transparency, or surface condition of the tooth part. These parameters can thus constitute additional dimensions to the shade space. The choice of vectors, which subtend the shade space or a hyperspace of the shade space, can be set by the spectral ranges of the illumination means. It can also be dictated by a choice of convenience suited to the habits of a dental technician receiving the shade measurements. A dental technician's habits or technical limitations can be respected further by choosing reference points of the shade space according to various possible dental shade guides.

Any interference light, reflections, or other lighting artifacts, capable of altering the shade measurement, appear differently in the various spectral ranges of the illumination. This enables interference effects to be better controlled. For example, one of the dimensions of the shade space can be used for the correction of interference effects.

The illumination means can have sources of visible light, but also sources of ultraviolet and/or infrared light. Light sources, and especially sources of visible light are preferably more or less monochrome. Their spectral extension is, for example, chosen to be less than 35 nm.

Furthermore, the light sources are preferably cold sources. The use of cold sources enables the design of a lighting system that is more compact and ergonomic, avoiding problems of heat dissipation. The sources are for example electroluminescent diodes (LED) or laser diodes.

The compactness and ergonomics of the illumination means can be improved further by the use of optical fibers coupled to the light sources. The fibers linking the light sources to light emitting sites enable the sources to be positioned more freely in a measuring instrument and thus the shape and dimensions to be optimized.

Another advantage, linked to the successive illumination of the tooth part with the light of various spectral ranges, is the possibility of using a single monochrome sensor, i.e. a sensor sensitive to the intensity of light regardless to the wavelength of the light. The use of one monochrome sensor, instead of a plurality of sensors provided with color filters, enables the size to be reduced. The sensor can be a point sensor, like a photodiode, or an image sensor having a plurality of pixels.

The invention device can be designed to measure the shade on a whole tooth, or a set of teeth, but also on a tooth part only. When the device is used for a tooth part only, the dentist can take into account any inhomogeneities of the tooth, by pointing the measurement to various places of the tooth. The dentist can take a measurement, for example, on five sites of the tooth, which are, starting from the gums: the cervical site, the central cervical site, the central site, the central incisor site and the incisor site. The shades of these dental sites can also be established by carrying out an overall measurement of the tooth, with a device equipped with a matrix sensor. In this case, the data of some pixels of the matrix are extracted, to establish the shades of the corresponding tooth parts.

The means for converting the signals of one point of the shade space into coordinates can comprise a signal shaping circuit, an analog/digital converter and a calculator. A common calculator can be used in part to establish the coordinates and in part to search for the shade corresponding to a reference point. For example, it can be a calculator in the form of a dedicated circuit, or a programmed computer.

In a particular embodiment of the device, this has two separate parts that are on the one hand, a measuring instrument, and on the other hand a measurement exploitation terminal. The terminal, which can house the previously mentioned calculator, can also be equipped with a viewing screen, a user interface and/or a communications interface. By housing one part of the device means in the exploitation terminal the measuring instrument can be made especially light and ergonomic. It is then linked to the exploitation terminal through an optical, electric or, preferably, Hertzian link. For example, the link is a Bluetooth type link.

The invention also relates to a measuring instrument for the device described above. It is a handheld instrument that the dentist can put near a tooth or tooth part in order to take a shade measurement.

In the main, the instrument comprises the sensor and the tooth illumination means. The means for shaping, or converting the measurement signals, as well as a data transmission interface can also be housed in the handheld measuring instrument.

Preferably, the instrument has two parts. A first part, called the "grip" is used to house the electrical circuits forming the means mentioned above. It can also comprise the light sources and a self-contained and stabilized electrical power supply. A second part is called the "illumination head". It comprises light emitting sites and possibly the light sensor. The head is the part of the measuring instrument put near the tooth to take the shade measurements. Preferably, it is a removable part mounted on the grip, so that it can be removed and sterilized separately.

The light emitting sites are arranged on the head, preferably around the sensor. They can be constituted directly by light sources, previously mentioned, or be linked to these sources by optical fibers. In the latter case, the light emitting sites are mainly constituted by the free ends of the optical fibers.

All the light emitting sites can be coupled in common to a set of light sources, to emit simultaneously light of the same spectral range, when at least one light source is activated.

According to one variant, the instrument head can have a plurality of subassemblies of light emitting sites, each subassembly of light emitting sites being coupled respectively to one light source taken from among a plurality of light sources of various spectral ranges. Thus, the light emitting sites of each subassembly emit simultaneously light of the same spectral range, but only when the corresponding light source is powered. The light emitting sites of each subassembly are preferably distributed in a more or less regular way around the sensor. In a simplified version of the tool, one light emitting site can be reserved for each color or each emission spectral range. If a number N of sites is planned for a given spectral range, these sites are, for example, arranged in a crown with an angular spacing of $2\pi/N$ rad.

Finally the invention relates to a method for measuring a dental shade. The method corresponds to the use of the previously described equipment. It comprises:
    the illumination of at least one tooth part, successively with the illumination light stimulated, with various spectral ranges,
    the reception of light coming from the tooth part, in response to each stimulated illumination, and the formation of a measurement signal of said light,
    the establishment, according to the measurement signal, of the coordinates of a measurement point in a shade space, in which reference points are also defined corresponding to the preset shades of a dental shade guide, and
    the search, for the tooth part, of a shade corresponding to the reference point closest to the measurement point, in the shade space.

Very simply, the coordinates of the measurement point can be established by converting the measurement signal into a digital signal and by retaining a coordinate proportional to the value of the digital signal, for each spectral range of the illumination light. The coordinates can be corrected one according to another, or can be subject to linear combinations to define new points in the shade space. The measurement signal can also undergo a correction, for example, an attenuation or amplification to take account of any variations of intensity of the illumination light sources.

The transparency of a tooth or tooth part can be determined by measuring the infrared light returned by the tooth in response to illumination with infrared light. High transparency is then demonstrated by low intensity returned light. The transparency can be used as a coordinate of the measurement point in one dimension of the shade space dedicated to this parameter. It can also be used for the correction of at least one other coordinate of the measurement point in another dimension. In particular, the measurement taken in infrared light can be used for the correction of one coordinate of the measurement point in a dimension corresponding to the red shades.

Such a correction enables the essentially red color of the back of the mouth proper to be taken into account, which can modify the perception of the most transparent parts of the teeth.

Another parameter of the tooth capable of being used as a coordinate of the shade space, or as a correction parameter, is the tooth's surface condition. The parameter is again called the roughness parameter. It is determined by illuminating the tooth with ultraviolet light. A smooth tooth tends to return a greater amount of ultraviolet light than is returned by a rough tooth. The roughness parameter can be used to establish one coordinate of the measurement point in one dimension of the shade space dedicated to this parameter. However, it is used preferably to determine any processing of the data coming from different tooth parts. An example of this is given below.

With a matrix type sensor, having a plurality of pixels it is possible to prepare a tooth map showing the shade of various parts of the tooth. A part assigned a low roughness parameter, is capable of being a source of interference reflection. The shade of this part thus undergoes a correction, for example by averaging with neighboring shades, or by modifying the saturation. A part assigned with a high roughness parameter, however will not undergo any or very little correction, according to the neighboring parts.

Additional information capable of being taken into account for the shade evaluation is the direct influence of the ambient light on the measurements. Therefore, at least two measurements can be taken: a first measurement of the light coming from the tooth is taken in the absence of stimulated light, i.e.

when the illumination means are not powered, and at least a second measurement is taken in the presence of the light stimulated by the illumination means. In this case, the coordinates of the measurement point are established according to a difference between these two measurements. For example, the measurement taken in the absence of stimulated illumination can be deducted from those taken later in the presence of a stimulated illumination.

The influence of the ambient light can also be limited by having suitable screens at the end of the illumination head. This aspect will be re-examined in the description that follows.

The light sources used in the illumination means are capable of producing light with intensity that varies over time. The variations can come from the sources themselves, but also from their electrical power supply.

The variations can be compensated for by measuring the intensity of the direct illumination light supplied in each spectral range. At the time of this measurement all or part of the illumination light is pointed directly at the sensor. This can be done using a mirror. When the illumination means comprise optical fibers, one or more fibers can also be connected directly to the sensor, to supply a measurement signal of the direct illumination.

The direct illumination measurement can then be used to modify the electrical power supply of the light sources. The power supply is modified in a way to make the measurement signal of the direct illumination enter a set range. The power supply of the light sources can also be maintained unchanged. In this case a correction can be made later to the coordinates of the measurement points established. For example, an attenuation of the illumination light of the tooth in a given spectral range can be compensated for by an increase of the coordinates of the measurement point in the dimensions of the shade space corresponding to the spectral range.

The position of the reference points in the shade space depends on the one hand on the dental shade guide to which these points correspond, and on the other hand on the choices of color vectors or dimensions that subtend the space. This can be dimensions corresponding to primary colors, such as red, green and blue or to any other set of colors. The choice of dental shade guides to which the reference points correspond can possibly be modifiable according to the user's wishes. The choice of dimensions of the shade space conditions the coordinates of the measurement points and reference points in this space. It can be fixed by a measurement exploitation program.

The search for a reference point closest to a measurement point can be done by algebraic calculation of the distances between the measurement point and various reference points. The calculation can occur either in the shade space according to all its dimensions, or in a projection of the shade space into a hyperspace of lesser dimension. For example, in a simplified way, it takes place in a two-dimensional space.

A data processing program can be designed to group the reference points of the shade space into families of shades. The search for the shade corresponding to a measurement point can then be executed iteratively. For example, the measurement point can firstly be positioned in a shade family and the shade search can then be refined within this family. This amounts to first searching the shade family closest to the measurement point and then searching within this family for the reference point closest to the measurement point.

Other characteristics and advantages of the invention will appear in the following description, with reference to the figures in the appended drawings. The description is given purely as an illustration and is not limiting.

DETAILED DESCRIPTION OF THE INVENTION

In the following description, identical, similar or equivalent parts of the various figures are marked by the same reference signs.

Figure 1:
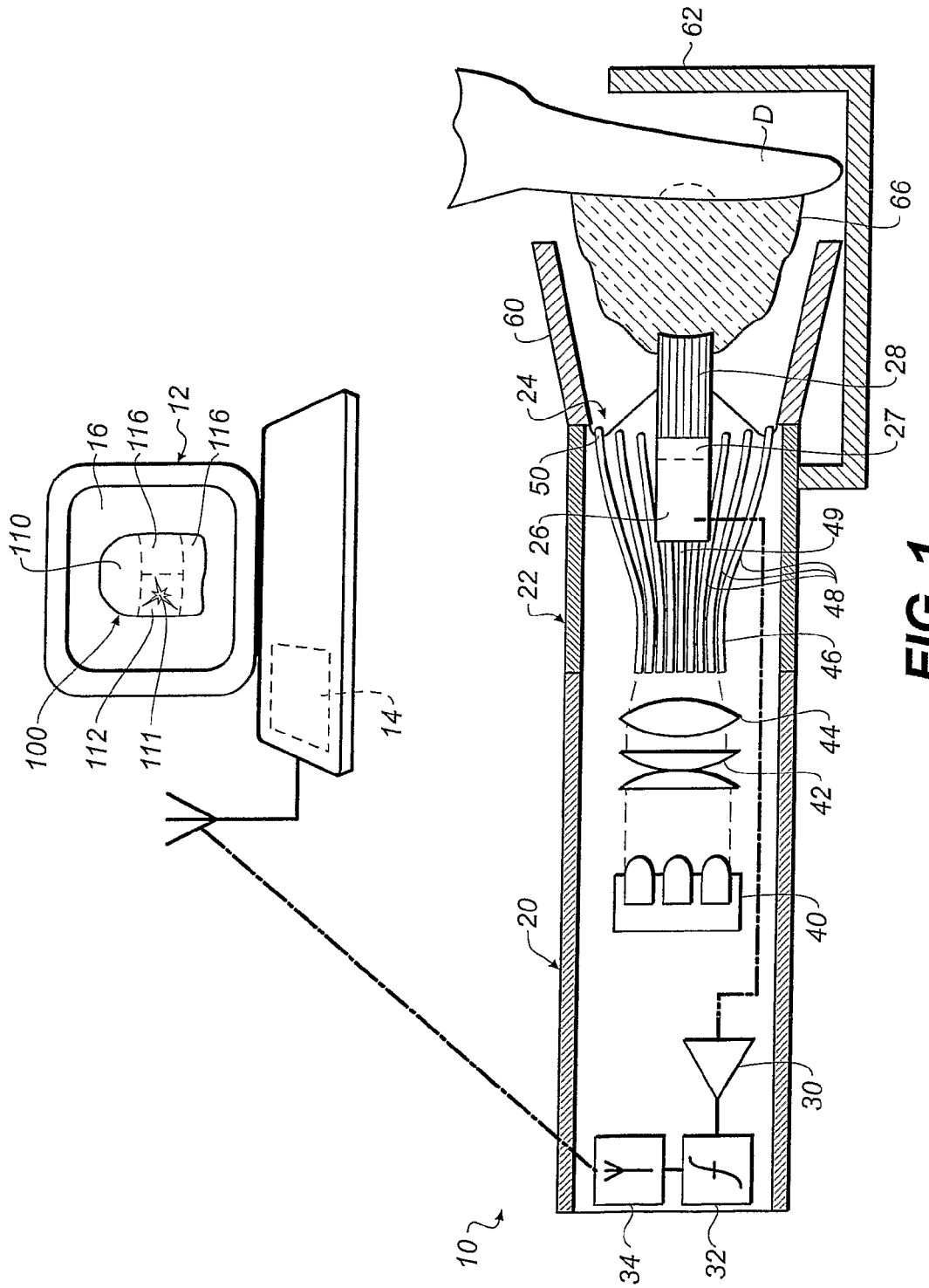
FIG. 1 is a simplified diagrammatic representation of a device according to the invention comprising a handheld measuring instrument and a measurement exploitation terminal.

FIG. 1 illustrates a device according to the invention. It comprises a handheld measuring instrument 10 and a measurement exploitation terminal 12. These two parts of the device are represented freehand to make the figure clear. The exploitation terminal 12 mainly comprises a calculator 14, capable of processing the measurement data coming from the handheld instrument 10, and a display 16. In the example of the figure, the display is a computer screen. The screen can be replaced by a more summary display capable of displaying the result of the shade measurement. In a particular embodiment of the device, the exploitation terminal can also be removed. The calculator and display are then integrated into the handheld instrument 10.

The handheld instrument comprises a grip 20 and an illumination head 22 solid with the grip. The head 22 is designed to be removed from the grip, especially in order to undergo sterilization after use.

The more or less cylindrical illumination head has a crown of light emitting sites 24. The light emitting sites surround a light sensor 26. This is provided with a length of optical fibers 28 that project from the head 22. The light emitting sites enable illumination light to be directed to a tooth part D. The sensor's length of optical fibers however enables the light returned by the tooth D to be collected and directed to the sensor. Its role is also a role of sensor protection. When the length of optical fibers 28 is longer, the sensor can also be housed in the grip 20 of the handheld instrument.

In the illustrated example, the sensor 26 is a monochrome sensor provided with a pixel matrix to supply a signal enabling the relevant tooth or tooth part image to be recovered. Preferably the sensor is a charge coupled device (CCD) sensor or a field-effect (MOS) sensor having a wide capture spectrum. When the capture spectrum does not cover all the spectral ranges of the tooth's illumination, a second sensor with an offset spectrum may be planned. However, in the illustrated example, another solution is used. The sensor 26 is provided with a scintillator 27 capable of converting ultraviolet light coming from the tooth into visible light which the sensor is sensitive to.

The sensor is linked to a circuit 30 for shaping the measurement signal, and, by means of this circuit, to an analog-digital converter 32. In response to the measurement signal, the converter delivers digital data. The converter transmits the data via an exchange interface 34 with the data exploitation terminal. In this case it is a zone Hertzian transmission interface, of Bluetooth type, for example. It is symbolized by a small antenna.

Reference 40 designates a set of electroluminescent diodes used as light sources. The set of diodes is capable of producing ultraviolet light centered on 405 nm, blue light, centered on 430 nm, yellow light, centered on 470 nm, green light, centered on 525 nm, orange light centered on 590 nm, red light centered on 660 nm and infrared light centered on 880 nm. Only three diodes are shown for reasons of clarity. Similarly, the electrical power supply means of the diodes, the sensor and electrical circuits are deliberately omitted on the figure.

The set of diodes is arranged in front of an optical group formed by a condenser 42 and a convergent lens 44. The optical group receives the light from one, or possibly several diodes of the same color of the set of diodes 40, and converges the light, more or less uniformly, onto an optical guide 46 formed of a plurality of optical fibers 48. Each optical fiber directs the illumination light stimulated by the diode to one of the light emitting sites previously mentioned. Each site comprises the free end 50 of a fiber. In this embodiment, the light stimulated by one of the light sources, in this case one of the diodes, is routed to all the light emitting sites. All the emission sites thus diffuse light of the same color, when one of the sources is powered.

Figure 2:
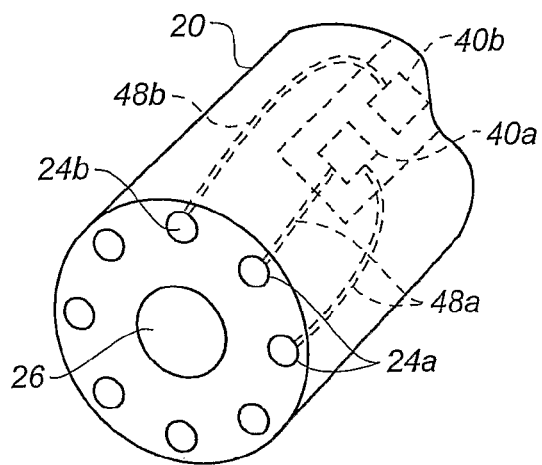
FIGS. 2 and 3 are simplified and partial diagrammatic representations of illumination heads capable of equipping a measuring instrument according to the invention.

Another way of implementing the invention is illustrated by FIG. 2 that only shows the end of the illumination head of a measuring instrument. Each light source 40*a*, 40*b* is individually linked to one or more light emitting sites 24*a*, 24*b*. The light sources 40*a*, 40*b* comprise surface mounted (SMD) or bare die electroluminescent diodes. The use of surface mounted diodes allows a good coupling with the optical fiber and a homogeneous illumination. Each of their surfaces can be treated as an individual light source. When a first source 40*a* is powered, two light emitting sites 24*a* receive light from the source. The light passes through optical fibers 48*a*, coupled to two different sides of the source 40*a*.

The light emitting site 24*b*, linked to another light source 40*b* by a fiber 48*b*, thus emits no light. The site 24*b* only emits light if a second source 40*b* is powered. Thus the references 24*a* and 24*b* designate subassemblies of light emitting sites that emit light occasionally, whenever the light source corresponding to them is powered.

Moreover, it may be seen on FIG. 2 that the sensor 26 is flush with the head surface, at the center of a crown of light emitting sites. The light emitting sites can also be arranged in several concentric crowns around the sensor.

Figure 3:
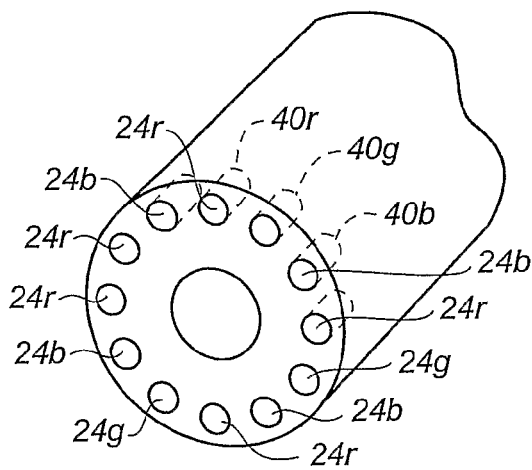

FIG. 3 shows yet another way of embodying the illumination head 20. A crown of illumination sites 24*r*, 24*g*, 24*b* is formed directly by the electroluminescent diodes 40*r*, 40*g*, 40*b* that are respectively flush with the surface of the free end of the head. Here no optical fiber is planned. It may also be seen that the emission sites of light of the same color, 24*r*, 24*g*, 24*b* are distributed around the crown with more or less regular angular spacing. The indices r, g, b are used here to designate the emission of red, green and blue light. This does not exclude the use of sources of other colors, or that of illumination in infrared or ultraviolet light.

Returning to FIG. 1, it may also be noted that one fiber 49, optically coupled to the light sources, is linked directly to the sensor 26. For example it is coupled to a photodiode of the sensor or to several pixels of the sensor. The sensor can thus deliver not only a measurement signal of the light coming from the tooth, but also a signal that is representative of the incident illumination light, coming from the light sources. This second signal can be used, as previously mentioned, to control the electrical power supply of the light sources, to control the processing of the measurement signal, or to correct the coordinates of the measurement point.

A number of accessories, intended to reduce the influence of interference light at the time of measuring, can equip the handheld measuring instrument.

A first accessory 60 is an opaque shield, with mainly conical shape. The shield 60 equips the end of the illumination head, so as to surround both the light emitting sites 24, the sensor 26, and possibly the length of optical fibers 28 that is linked to the sensor. The shield tends to eliminate the arrival of ambient light in the neighborhood of the tooth part that is the subject of a measurement. This enables the prevention not only of interference illumination of the tooth but also of the direct capture of the interference light.

Another opaque shield 62, that is black, matt and uniform, is held far enough from the end of the illumination head and the first shield 60 to be able to insert a tooth to be measured between these parts. The second shield is thus located on a rear surface of the tooth, opposite the surface whose shade is required to be measured. The shield prevents light returned by the mouth proper towards the rear surface of the tooth from modifying the shade of the tooth in an uncontrolled way, especially in its most transparent parts.

As previously mentioned, a smooth tooth part or a smooth tooth is more capable of creating interference reflections than a rough tooth. This can be corrected, at least in part, by using the roughness parameter. A shade map 100 of the tooth D is represented on the display 16. It is prepared from shade measurements taken in several parts of the tooth 110, 112, 114, 116. The reference 111 designates a specular reflection in a tooth part 112. If the tooth part 112 assigned the specular reflection 111 has a very low roughness parameter, following a measurement taken in ultraviolet illumination, the specular reflection 111 is interpreted as an anomaly. The shade of the relevant tooth part 112 can be replaced or compensated for by a shades average calculated according to the shade of the other neighboring tooth parts 110, 114, 116. If, however, the roughness parameter is high, i.e. if the tooth part 112 is textured, a lesser or zero correction of the shade is envisaged. Shade corrections of the tooth part assigned with a specular reflection can also be made on the coordinates of the measurement point in the shade space, which corresponds to the tooth part. On the figure, the specular reflection 111 is shown for illustration purposes only. The corrections of shade, and in particular of the luminosity or saturation, can occur before display, so that the specular reflection 111 finally does not appear.

The specular reflection or interference light effects can also be limited or eliminated by having a gel, liquid, or more generally a transparent substance 66 between the sensor and the tooth. The transparent substance comes into contact with the sensor, or, as FIG. 1 shows, in contact with the length of optical fibers 28 which equip the sensor 26. The transparent substance is also in contact with the tooth. It prevents a high change of optical index between the tooth enamel and the air. In this way the influence of the tooth texture on the reflection of the illumination light can be reduced. The transparent substance is preferably a liquid or a gel whose refraction index is as close as possible to that of the tooth enamel, nevertheless, a simple sugared solution can be selected.

The length of optical fibers lead the measurement light to the sensor. The optical fibers 28 may as well be used as a means for producing an image of the tooth on the sensor, and especially on a matrix type sensor. The fibers may be replaced by any suitable lens or optics.

Figure 4:
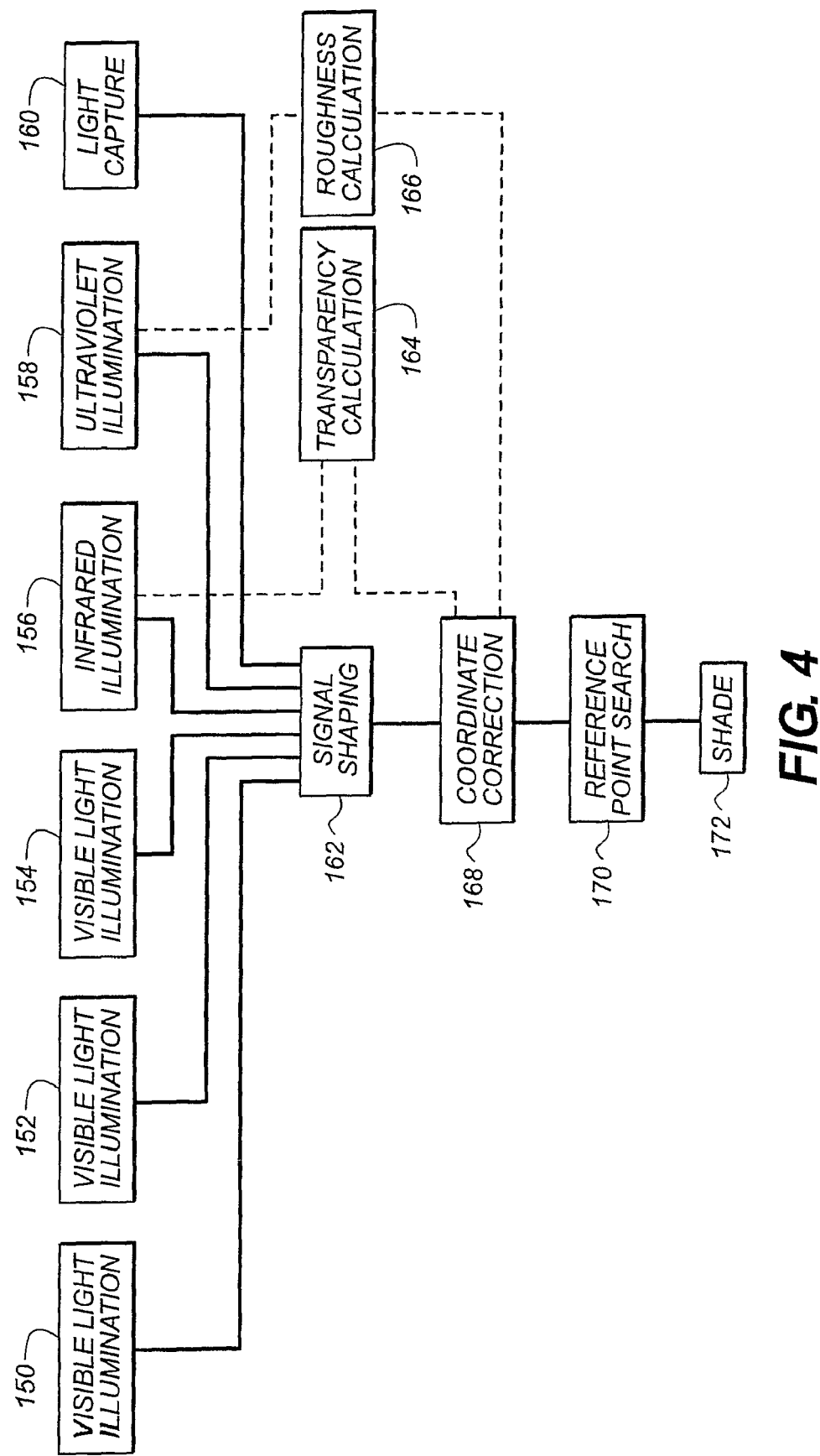
FIG. 4 is a flowchart illustrating a method of measuring dental shade according to the invention.

FIG. 4 is a flowchart showing the main steps of a shade measuring method, according to the invention. A first step comprises the illumination of the tooth with the visible light and the capture of the light returned by the tooth. This operation, indicated by the references 150, 152, 154, is repeated for several illumination wavelength ranges. The references 156 and 158 designate the same operations performed with infrared and ultraviolet illuminations. Finally, the reference 160 indicates a capture of light coming from the tooth in the absence of illumination. This capture enables the influence of the ambient lighting to be allowed for.

A next step, indicated by the reference 162 comprises the shaping of the measurement signals delivered at the time of the captures, and the calculation of the coordinates of the measurement points. The light captured in the absence of illumination is subtracted from that captured in the presence of a stimulated illumination. Furthermore, and as already mentioned, the light captured under infrared and ultraviolet illumination is used to calculate the tooth's parameters of transparency 164 and roughness 166. The parameters may be displayed. They can also be shaped and converted into the measurement point coordinates in the corresponding dimensions of a shade space.

Figure 5:
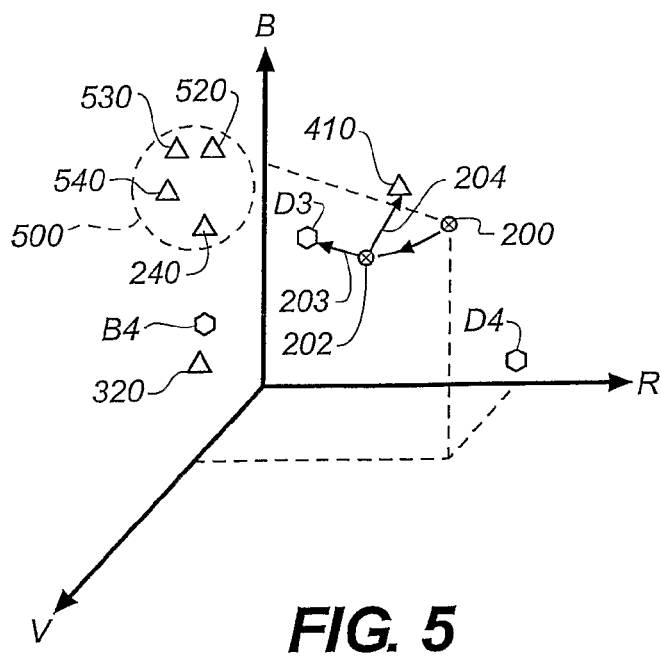
FIG. 5 is a three-axis representation of a shade space, and illustrates the search for a dental shade using a measuring method according to the invention.

A next step 168, which will again be described in relation to FIG. 5, comprises the corrections of the measurement point coordinates. The corrections are made either according to other measurement points established for other tooth parts, or neighboring teeth, or according to the roughness and/or transparency parameters 164, 166. The corrected coordinates are used in a step 170 to search in the shade space for reference points corresponding to the shades of a dental shade guide. This step is also illustrated by FIG. 5. Finally, the reference 172 indicates the display of the shade. The display can occur with that of an image of the tooth, so as to show a map of the tooth shades.

FIG. 5 illustrates the establishment of a tooth shade based on the measurement signal converted into a point of a shade space.

The following description refers to the establishment of the tooth's shade based on the measurement signal produced by a sensor such as a photodiode. When the sensor is a matrix sensor with a plurality of pixels, one shade, or one measurement point in the shade space can be established for each pixel, or for a pixel set. Averages can then be performed on pixel groups, taking into account, for example, the roughness parameter already mentioned.

In a very simplified way FIG. 5 shows a three-dimensional shade space R, G, B. These dimensions correspond, for example, to the colors of three light sources, red, green and blue, of the illumination means. It should be stated that the dimensions do not necessarily coincide with the colors of the light sources. The sources can emit light that corresponds to a combination of colors that subtend the shade space. Furthermore, the number of dimensions of the shade space is not limited to three. The shade space can in particular include dimensions corresponding to measurements in infrared and ultraviolet light.

The measurement signal obtained in response to an illumination in a given spectral range, i.e. with a given color, is converted into a digital value, or code, by the analog-digital converter. This code, or a value proportional to the code, then constitutes one coordinate of the measurement point in the dimension corresponding to the illumination color. If the illumination light is a combination of colors of several dimensions of the shade space, the coordinates according to the relevant dimensions correspond to the code weighted by proportionality coefficients.

Generally, the measurements taken in response to the various illuminations can have a certain degree of correlation. A principal component analysis then enables the search for a shade space in which the degree of redundancy of the measurements is minimized.

The reference 200 designates one point of the shade space. The coordinates of the point in the dimensions of the shade space are symbolized by dotted line projections on the R, G, B dimension axes.

The reference 202 designates a new point of the shade space whose coordinates are established by correcting the coordinates of the initial measurement point 200. The corrections take into account, for example, the transparency of the tooth part, the ambient lighting, the incident light coming from the light sources, etc.

As an illustration, one coordinate of the shade space corresponding to infrared light can be used to correct the component in the dimension R for red. The new point 202 of the shade space is used to search for the shade of the tooth part.

Also shown in the shade space are the reference points 320, 410, 540. These are shown as small triangles. They correspond to known values of a first dental shade guide. The coordinates of these points can be acquired by the measuring instrument in a learning phase, or be programmed. Another set of reference points B4, D3, D4, shown by small hexagons, corresponds to the shades of a second dental shade guide. Only a reduced number of reference points is shown for reasons of clarity of the figure.

The reference point closest to the measurement point, possibly corrected, is sought to establish the shade of the relevant tooth part. This point is sought for a given dental shade guide. In the case of the figure, the shade of the tooth part corresponding to the corrected measurement point 202 is the shade corresponding to the reference point 410 of the first dental shade guide. For example, this is shade 410 of the "Cromascop" dental shade guide. The selected shade can also be that corresponding to point D3 of the second dental shade guide. For example, this is shade D3 of the "Vita Lumin Classic" dental shade guide.

It may be noted that the measurement point does not exactly coincide with the reference points. A correction vector 203, 204, of the shade space, pointing from the measurement point to the reference point, indicates the distance and direction of the gap present between the measurement point and the selected reference point. Data representative of the length and direction of the correction vector can be displayed with the shade, on a control screen or dedicated display.

The search for the reference point closest to the measurement point can be performed in the shade space or in a hyperspace of the shade space. For example, all the points can be projected into a space with only two-dimensions.

The search for the reference points can occur by calculating the distances between the measurement point and a set of saved reference points, by treating the shade space as a vectorial space, and by selecting the shortest algebraic distance. The shade space can also be considered as a space described by discreet coordinate values. The reference points can then be saved in a programmable memory, for example an EPROM, and the digital codes or coordinates of the measuring points can be used to address the memory.

The search for the reference shades of a dental shade guide corresponding to a measurement point can also be performed by a neural net. In this case the invention device undergoes a learning phase during which the shades of a dental shade guide are measured.

As previously mentioned, the reference points of the shade space can be grouped by families. Such a family 500 is shown in FIG. 5. It groups the reference points 240, 520, 530, 540 and can be represented by a common point corresponding to the barycenter of these points.

The search for the shade can then occur in several steps. In a first step, the shade family to which the measurement point corresponds is sought. This occurs by calculating the distances between the measurement point and the common reference points representing the families. With the closest family having been selected, the search for the closest reference shade is undertaken.

The invention claimed is:

1. A dental shade measuring device comprising:
   illumination means for successively illuminating at least one part of a tooth with light of different colors;
   at least one monochrome sensor sensitive to intensity of light coming from the tooth part, in response to the illumination, to generate for each different color of illumination, at least one measurement signal;
   means for converting the measurement signals corresponding to the tooth part, into coordinates of a measurement point, in a shade space in which "reference" points are also defined, corresponding to the preset shades of a dental shade guide;
   automatic shade search means for automatically searching a shade corresponding to the reference point closest to the measurement point, in the shade space, for the tooth part;
   wherein the illumination means comprise substantially monochrome light sources;
   wherein the light sources are cold sources; and
   wherein the light sources comprise electroluminescent diodes or laser diodes, centered on the colors red, green, blue, yellow and orange.

2. A device according to claim 1, wherein the illumination means comprise sources of visible light and at least one source of ultraviolet light.

3. A dental shade measuring device comprising:
   illumination means for successively illuminating at least one part of a tooth with light of different colors;
   at least one monochrome sensor sensitive to intensity of light coming from the tooth part, in response to the illumination, to generate for each different color of illumination, at least one measurement signal;
   means for converting the measurement signals corresponding to the tooth part, into coordinates of a measurement point, in a shade space in which "reference" points are also defined, corresponding to the preset shades of a dental shade guide;
   automatic shade search means for automatically searching a shade corresponding to the reference point closest to the measurement point, in the shade space, for the tooth part; and
   wherein the illumination means comprise sources of visible light and at least one source of infrared light.

4. A device according to claim 1, with:
   a measuring instrument comprising the illumination means and the sensor; and
   a measurement exploitation terminal, remote from the measuring instrument, forming the shade search means.

5. A device according to claim 4, wherein the measuring instrument is linked to the terminal by a link selected from among: an electrical link, an optical link and a Hertzian link.

6. A device according to claim 4, wherein the sensor is a photodiode light sensor.

7. A device according to claim 4, wherein the sensor is an image sensor with a plurality of pixels.

8. A dental shade measuring method comprising:
   illuminating at least one tooth part, successively with stimulated illumination light, with various spectral ranges, wherein illuminating the at least one tooth part is accomplished with a plurality of sources of visible light and one source of infrared light;
   receiving light coming from the tooth part, in response to each stimulated illumination, and the formation of a measurement signal of the light;
   establishing, according to the measurement signal, the coordinates of a measurement point in a shade space, in which reference points are also defined corresponding to the preset shades of a dental shade guide; and
   searching, for the tooth part, for a shade corresponding to a reference point closest to the measurement point, in the shade space.

9. The method according to claim 8, comprising the establishment, in response to the illumination of the tooth part with infrared light, of a transparency value of the tooth part.

10. The method according to claim 9, comprising the correction of at least one coordinate of the measurement point according to the transparency value of the tooth part.

11. A dental shade measuring method comprising:
    illuminating at least one tooth part, successively with stimulated illumination light, with various spectral ranges;
    receiving light coming from the tooth part, in response to each stimulated illumination, and the formation of a measurement signal of the light;
    establishing, according to the measurement signal, the coordinates of a measurement point in a shade space, in which reference points are also defined corresponding to the preset shades of a dental shade guide; and
    searching, for the tooth part, for a shade corresponding to a reference point closest to the measurement point, in the shade space,
    comprising illuminating the at least one tooth part with a plurality of sources of visible light and one source of ultraviolet light and the establishment, according to the light collected in response to the illumination of the tooth part with the ultraviolet light, of a roughness parameter of the tooth part.

12. The method according to claim 11, comprising: the use of a sensor with a plurality of pixels, to collect the light from a plurality of selected tooth parts, and the establishment of an average shade for the selected tooth parts, the average shade being weighted by the roughness parameter of each selected tooth part.

13. The method according to claim 8, also comprising the reception of light from the tooth part, in the absence of the stimulated illumination, and the establishment of the coordinates of the measuring point according to the gap between the light received in the presence and in the absence of the stimulated illumination light.

14. The method according to claim 8, also comprising the direct reception of part of the stimulated illumination light, and the correction of at least one from among: the coordinates of the measuring point, and a power supply of a source of stimulated illumination light, according to the direct reception of the stimulated illumination light.

15. The method according to claim 8, comprising reception of the light from the tooth part illuminated through a transparent substance, in liquid or gel form, applied to the tooth part.

16. A dental shade measuring method comprising:
illuminating at least one tooth part, successively with stimulated illumination light, with various spectral ranges;
receiving light coming from the tooth part, in response to each stimulated illumination, and the formation of a measurement signal of the light;
establishing, according to the measurement signal, the coordinates of a measurement point in a shade space, in which reference points are also defined corresponding to the preset shades of a dental shade guide; and
searching, for the tooth part, for a shade corresponding to a reference point closest to the measurement point, in the shade space, and
establishing the length and direction of a correction vector of the shade space, defined by the measurement point and the reference point linked to the tooth part, and the indication to a user of the reference shade corresponding to the tooth part, together with shade correction data according to at least one from among the direction and the length of the correction vector.

17. The method according to claim 8, comprising the illumination of a whole tooth, the establishment of tooth shades of parts of the tooth, and the preparation of a map of shades corresponding to the whole tooth.

* * * * *